T. BLANEY AND D. WILLIAMS.
OVERHEAD TROLLEY OR COLLECTOR FOR ELECTRIC TRAMWAY AND RAILWAY VEHICLES.
APPLICATION FILED JUNE 6, 1921.

1,393,939.

Patented Oct. 18, 1921.

2 SHEETS—SHEET 1.

Inventors
Thomas Blaney
David Williams.

By

Associate Attorneys.

UNITED STATES PATENT OFFICE.

THOMAS BLANEY AND DAVID WILLIAMS, OF WALTON, LIVERPOOL, ENGLAND, ASSIGNORS OF ONE-HALF TO THE EQUIPMENT AND ENGINEERING COMPANY, OF LONDON, ENGLAND.

OVERHEAD TROLLEY OR COLLECTOR FOR ELECTRIC TRAMWAY AND RAILWAY VEHICLES.

1,393,939. Specification of Letters Patent. Patented Oct. 18, 1921.

Application filed June 6, 1921. Serial No. 475,400.

*To all whom it may concern:*

Be it known that we, THOMAS BLANEY and DAVID WILLIAMS, subjects of the King of Great Britain, residing in Walton, Liverpool, in the county of Lancaster and Kingdom of England, have invented certain new and useful Improvements in Overhead Trolleys or Collectors for Electric Tramway and Railway Vehicles, of which the following is a specification.

This invention has reference to overhead trolleys for electric tramway and railway vehicles, and has for its object to provide simple and reliable means for absorbing any sudden jar or shock caused by the trolley striking against an obstruction in the overhead wire, thus reducing the liability of the trolley leaving the wire.

The invention is characterized in that the trolley head in which the trolley pulley is journaled and which is pivoted to the trolley head socket, is provided lower down with a curved arm which bears against a spring contained within a curved tubular extension chamber projecting downwardly from the under side of the trolley head socket so as to support the trolley pulley socket in normal position while admitting of it yielding a little when the trolley strikes an obstruction.

In the accompanying drawings:—

Figures 1, 2:
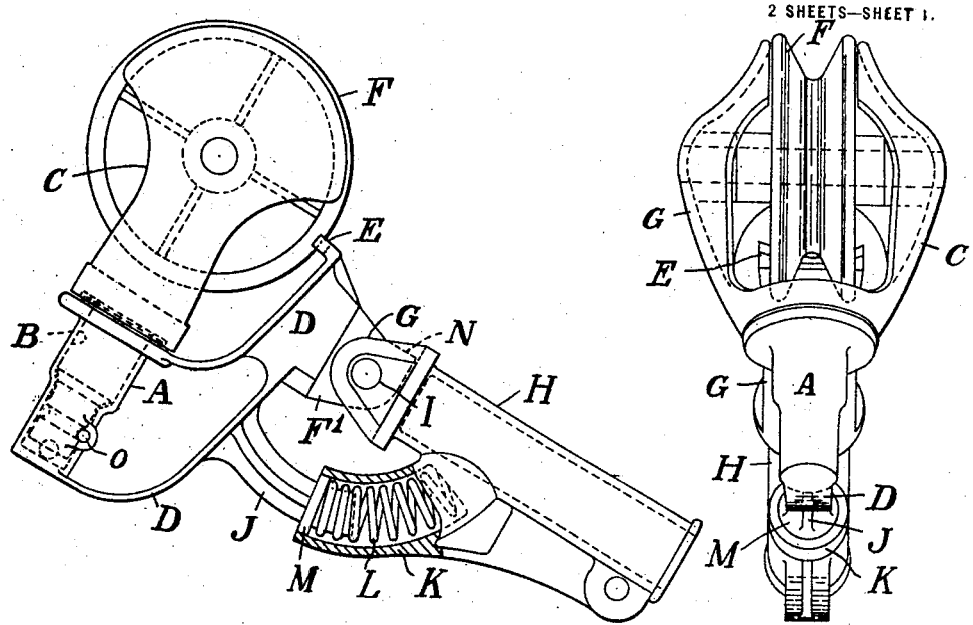
Figure 3:
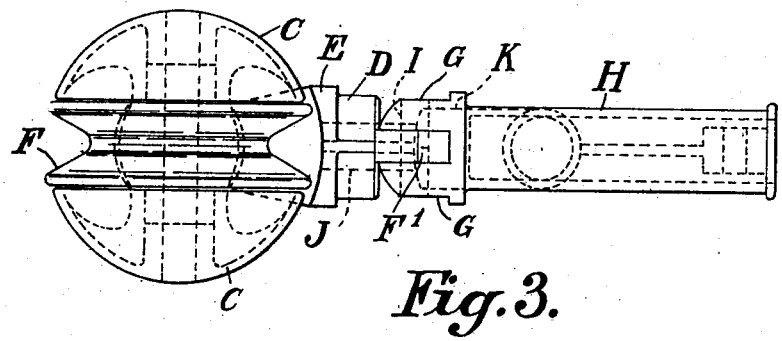
Figure 4:
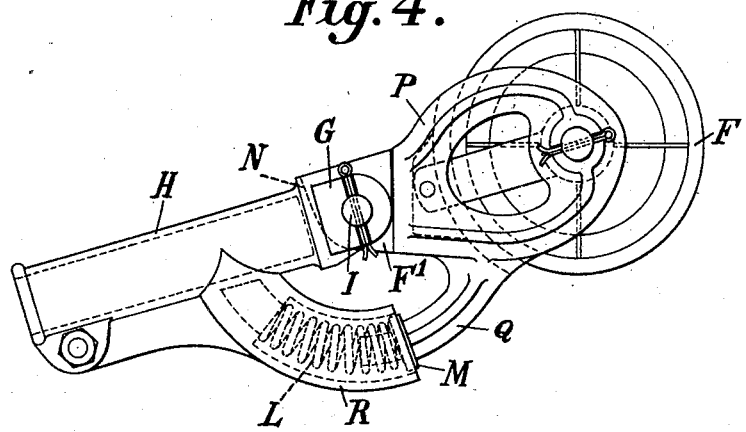
Figure 5:
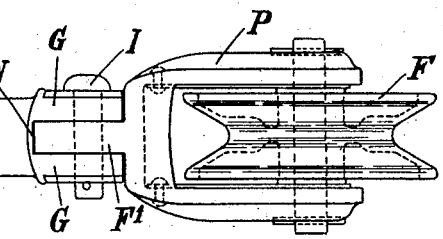

Figure 1 is a side elevation partly in section of the trolley head complete of the type having a socket in which the pillar of vertical fork of the trolley pulley swivels, Fig. 2 is a rear view of the trolley head, Fig. 3 is a plan view thereof, Fig. 4 is a side elevation of a trolley head of the type in which the trolley is journaled in a fork pivoted to the trolley head socket which fork is not arranged to swivel as in Fig. 1, Fig. 5 is a plan view thereof.

Referring first to Figs. 1, 2 and 3, A is the trolley head in which the pillar B of the vertical fork C swivels. This head A has a web member D projecting forwardly and upwardly from it, and it terminates at one point adjacent to the trolley in a guard piece E which prevents any danger of the span or other wire getting between or catching between the trolley F and the web D of the head A, while at another point this web member has an ear piece F' which enters between two jaws G projecting longitudinally from the end of the socket H of the trolley head, and is pivoted thereto by the hinge pin I, so that the head A (which carries the fork and trolley) is capable of being depressed in a vertical plane which coincides with that of the trolley pole. The web D has a curved extension arm J projecting forwardly from it, and enters a curved tubular chamber K which projects downwardly from the under side of the trolley head socket H, the radius of the curved chamber K coinciding with that of the curved arm J, both being struck from the same center namely the hinge pin I. In this chamber K is provided a spiral spring L which acting upon a shoulder M on the arm J, holds the socket with the fork spindle and trolley in a position approximately at right angles to the axis of the trolley pole. The trolley therefore as it rolls along the overhead wire, encounters the joints that secure the overhead conductor to the span wires, or the frogs or other obstructions, and the trolley will at once yield and be thrown or turned rearwardly on its hinge pin I out of the normal position shown in Fig. 1, and the spring L be compressed. The spring L will thus absorb the sudden jar or shock of the obstruction, reduce noise, and the liability of the trolley leaving the conductor. The trolley immediately it recovers from the sudden jar or shock of encountering the obstruction, will return to its normal position again. The ear piece F' is formed at one part (that is above the axis of the trolley head socket H) with a nose piece or abutment N which abuts against the base of the space between the two jaws G, and while offering no obstruction to the trolley being turned downwardly or depressed on its pivot I, absolutely prevents the collar or shoulder M or the spring L coming out of the chamber K. The trolley head A that the fork spindle B swivels in, is provided with a hole O in which fits a pin engaging a groove in the fork spindle B so as to allow the spindle to revolve but prevent it coming out of the socket. The construction of the trolley head is according to this invention simplified, the liability of sparking is brought down to a minimum owing to the fact that the spring enables the trolley to give somewhat, when it meets an obstruction or unevenness in the wire, and furthermore only a very moderate spring tension is required on the pole.

Referring now to Figs. 4 and 5, P is the trolley head or fork in which the trolley F is mounted, and this head has an ear piece F' at one end which enters between two jaws G projecting from the trolley head socket H and is pivoted thereto by the hinge pin I so that the head which carries the trolley is capable of being depressed in a vertical plane which coincides with that of the trolley pole. The head P has a curved extension arm Q projecting forwardly from it, and enters a curved tubular chamber R which projects downwardly from the under side of the trolley head socket H, the radius of the curved chamber R coinciding with that of the curved arm Q. In this chamber R is provided a spiral spring L which acting upon a shoulder on the arm Q holds the trolley head and trolley in a position approximately in line with the axis of the trolley pole. In this arrangement as in the other one, the trolley with its head will yield on its hinge pin I when the trolley encounters an obstruction, and return to its normal position again. The ear piece F' is formed at one part namely above the axis of the trolley head socket H with an abutment N which abuts against the base of the space between the two jaws G and forms a stop to prevent the collar or shoulder M or the spring L coming out of the chamber R.

We declare that what we claim is:—

1. In an overhead trolley or collector, the combination of a trolley head socket having a curved tubular chamber supplied with a spiral spring, and a trolley head one end of which is hinged to the trolley head socket while lower down it has a curved arm which enters the curved tubular chamber and bears against the spring.

2. In an overhead trolley or collector, the combination of a trolley head socket having a curved tubular chamber supplied with a spiral spring, and a trolley head provided with a socket in which the trolley pillar swivels and a web member projecting forwardly and upwardly from the said socket, the upper portion of the said web being hinged to the end of the trolley head socket while lower down it has a curved arm which bears against the spiral spring.

3. In an overhead trolley or collector, in which the trolley head is formed with a socket in which a trolley fork swivels, the combination with the trolley head of a forwardly and upwardly projecting member the upper part of which is pivoted to the trolley head socket, while lower down it is provided with a curved arm which bears against the spring contained within the curved tubular extension chamber projecting downwardly from the under side of the trolley head socket, such spring supporting the trolley pillar socket in normal position while admitting of it yielding a little when the trolley strikes an obstruction.

4. In an overhead trolley or collector, the combination of a trolley head socket having a curved tubular chamber supplied with a spiral spring, a trolley head one end of which is hinged to the trolley head socket by means of an ear piece on one part entering between two jaws on the other part and pivoted together by a hinge pin, and a nose piece adapted to abut against the base of the space between the two jaws to form a stop.

In witness whereof, we have hereunto signed our names this 17th day of May, 1921, in the presence of two subscribing witnesses.

THOMAS BLANEY.
DAVID WILLIAMS.

Witnesses:
JAS. C. McSAE,
J. McLACHLAN.